(12) United States Patent
Fang et al.

(10) Patent No.: US 12,079,604 B2
(45) Date of Patent: Sep. 3, 2024

(54) EMBEDDED USER INTERFACE ELEMENTS

(71) Applicant: Stripe, Inc., South San Francisco, CA (US)

(72) Inventors: Fanyun Fang, San Francisco, CA (US); Christopher Jeffrey Streeter, Ardmore, PA (US); Jorge Eugenio Aguirre Gonzalez, Bothell, WA (US); Kevin Chekin Ho, New York, NY (US); Jason Gupta, San Francisco, CA (US); Matthew Anthony Basta, Raleigh, NC (US); Samuel De Jun Victor Lye, San Francisco, CA (US)

(73) Assignee: Stripe, Inc., South San Francisco, CA (US)

( * ) Notice: Subject to any disclaimer, the term of this patent is extended or adjusted under 35 U.S.C. 154(b) by 112 days.

(21) Appl. No.: 18/086,631

(22) Filed: Dec. 21, 2022

(65) Prior Publication Data
US 2024/0211219 A1 Jun. 27, 2024

(51) Int. Cl.
| | | |
|---|---|---|
| *G06F 8/38* | (2018.01) | |
| *G06F 3/0481* | (2022.01) | |
| *G06F 3/0484* | (2022.01) | |
| *G06F 9/451* | (2018.01) | |
| *G06F 9/54* | (2006.01) | |
| *G06F 16/958* | (2019.01) | |
| *G06F 40/143* | (2020.01) | |

(52) U.S. Cl.
CPC .............. *G06F 8/38* (2013.01); *G06F 3/0481* (2013.01); *G06F 3/0484* (2013.01); *G06F 9/451* (2018.02); *G06F 9/548* (2013.01); *G06F 16/986* (2019.01); *G06F 40/143* (2020.01)

(58) Field of Classification Search
None
See application file for complete search history.

(56) References Cited

U.S. PATENT DOCUMENTS

| | | | |
|---|---|---|---|
| 6,801,224 B1 * | 10/2004 | Lewallen | G06F 8/38 715/788 |
| 10,635,746 B2 | 4/2020 | Kong et al. | |
| 2013/0159890 A1 * | 6/2013 | Rossi | G06F 9/451 715/762 |
| 2021/0248205 A1 * | 8/2021 | Tank | G06F 16/986 |

(Continued)

*Primary Examiner* — Qing Chen
(74) *Attorney, Agent, or Firm* — BAKERHOSTETLER

(57) ABSTRACT

In some embodiments, a computer system receives a request to render components of a webpage. In some embodiments, in response to receiving the request, a platform of the webpage loads a script element that creates an inline frame element and receives a secret token. In some embodiments, the computer system authenticates an embedded session within the platform using the secret token and generates an API key, wherein the API key is used by the inline frame element to authenticate API requests to an API server. In some embodiments, the computer system receives, via the inline frame element, data corresponding to the one or more embedded UI elements from a resource associated with a third-party entity, wherein the inline frame element is a proxy between the platform and the API server. In some embodiments, the computer system renders the one or more embedded UI elements in a shadow document object model.

20 Claims, 6 Drawing Sheets

(56) References Cited

U.S. PATENT DOCUMENTS

| | | | |
|---|---|---|---|
| 2023/0153895 A1* | 5/2023 | Marla | G06F 3/04847 |
| | | | 705/27.1 |
| 2023/0186376 A1* | 6/2023 | Ortiz | G06Q 30/0255 |
| | | | 705/27.2 |

* cited by examiner

FIG. 4

EMBEDDED USER INTERFACE ELEMENTS

TECHNICAL FIELD

The disclosure generally relates to software application development, and in particular embedded user interface elements.

BACKGROUND

When deploying a webpage or application, software developers commonly integrate components that are sourced from a third-party developer. For example, a software developer can integrate a component, built by a third-party developer, for accepting payments into a webpage that offers goods for purchase. The payment acceptance component can, in some embodiments, allow entry of payment information and facilitate the authorization and exchange of funds. Such integrated third-party components can allow the software developer to deploy their functioning webpage without having to build their own components (e.g., a component for payment flow handling and/or accepting payments). These third-party, embedded components can have user interface elements that are added to the webpage for interaction with an end user.

SUMMARY

Some techniques for embedding a user interface (UI) element developed by a third-party can be cumbersome, time consuming, and/or inefficient due to the amount of work required by a software developer who is attempting to integrate the UI element into a webpage (and/or an application). This work might be required to ensure, amongst other reasons, that (1) the component functions as intended, (2) the component displays correctly with the other webpage content, and (3) the appropriate security and permissions associated with the webpage and the component are maintained. With respect to functioning as intended, the software developer may need to ensure that an embedded UI element has access to the data that the embedded UI element needs to function properly, including any necessary authentication and/or permissions requirements. With respect to displaying correctly, the software developer may need to ensure that the embedded UI element displays correctly and that the webpage as a whole, including non-embedded UI elements, displays correctly after the embedded UI element is integrated into the webpage. With respect to data security, the developer may need to ensure that the embedded UI element can be configured with the proper permissions for functioning correctly without sacrificing the security of the webpage.

This disclosure provides an embedded user interface element that can add functionality to a webpage or application, have a user interface appearance that is independent of the platform user interface, and be subject to authentication and permissions-based restrictions on access to user data hosted by a third-party entity.

In some embodiments, a method that is performed by a computer system is described. In some embodiments, the method comprises: receiving a request to render components of a webpage, wherein the webpage includes a platform, a platform user interface (UI), one or more embedded UI elements, and an inline frame element; in response to receiving the request, causing the platform to load a script element that creates the inline frame element and receives a secret token; authenticating an embedded session within the platform using the secret token; in response to authenticating the embedded session, generating an application programming interface (API) key, wherein the API key is used by the inline frame element to authenticate API requests to a resource associated with a third-party; receiving, via the inline frame element, data corresponding to the one or more embedded UI elements from the resource associated with a third-party, wherein the inline frame element is a proxy between the platform and the resource associated with a third-party; rendering the one or more embedded UI elements in a shadow document object model (DOM) based on the data corresponding to the one or more embedded UI elements received from the inline frame element, wherein the inline frame element does not render a UI; and causing display of the one or more embedded UI elements in the platform UI on the webpage.

In some embodiments, a non-transitory computer-readable storage medium storing one or more programs configured to be executed by one or more processors of a computer system is described. In some embodiments, the one or more programs includes instructions for: receiving a request to render components of a webpage, wherein the webpage includes a platform, a platform user interface (UI), one or more embedded UI elements, and an inline frame element; in response to receiving the request, causing the platform to load a script element that creates the inline frame element and receives a secret token; authenticating an embedded session within the platform using the secret token; in response to authenticating the embedded session, generating an application programming interface (API) key, wherein the API key is used by the inline frame element to authenticate API requests to a resource associated with a third-party; receiving, via the inline frame element, data corresponding to the one or more embedded UI elements from the resource associated with a third-party, wherein the inline frame element is a proxy between the platform and the resource associated with a third-party; rendering the one or more embedded UI elements in a shadow document object model (DOM) based on the data corresponding to the one or more embedded UI elements received from the inline frame element, wherein the inline frame element does not render a UI; and causing display of the one or more embedded UI elements in the platform UI on the webpage.

In some embodiments, a non-transitory computer-readable storage medium storing one or more programs configured to be executed by one or more processors of a computer system is described. In some embodiments, the one or more programs includes instructions for: receiving a request to render components of a webpage, wherein the webpage includes a platform, a platform user interface (UI), one or more embedded UI elements, and an inline frame element; in response to receiving the request, causing the platform to load a script element that creates the inline frame element and receives a secret token; authenticating an embedded session within the platform using the secret token; in response to authenticating the embedded session, generating an application programming interface (API) key, wherein the API key is used by the inline frame element to authenticate API requests to a resource associated with a third-party; receiving, via the inline frame element, data corresponding to the one or more embedded UI elements from the resource associated with a third-party, wherein the inline frame element is a proxy between the platform and the resource associated with a third-party; rendering the one or more embedded UI elements in a shadow document object model (DOM) based on the data corresponding to the one or more embedded UI elements received from the inline frame element, wherein the inline frame element does not render a UI; and causing display of the one or more embedded UI elements in the platform UI on the webpage.

In some embodiments, a computer system is described. In some embodiments, the computer system comprises one or more processors and memory storing one or more program configured to be executed by the one or more processors. In some embodiments, the one or more programs includes instructions for: receiving a request to render components of a webpage, wherein the webpage includes a platform, a platform user interface (UI), one or more embedded UI elements, and an inline frame element; in response to receiving the request, causing the platform to load a script element that creates the inline frame element and receives a secret token; authenticating an embedded session within the platform using the secret token; in response to authenticating the embedded session, generating an application programming interface (API) key, wherein the API key is used by the inline frame element to authenticate API requests to a resource associated with a third-party; receiving, via the inline frame element, data corresponding to the one or more embedded UI elements from the resource associated with a third-party, wherein the inline frame element is a proxy between the platform and the resource associated with a third-party; rendering the one or more embedded UI elements in a shadow document object model (DOM) based on the data corresponding to the one or more embedded UI elements received from the inline frame element, wherein the inline frame element does not render a UI; and causing display of the one or more embedded UI elements in the platform UI on the webpage.

In some embodiments, a computer system is described. In some embodiments, the computer system includes: means for receiving a request to render components of a webpage, wherein the webpage includes a platform, a platform user interface (UI), one or more embedded UI elements, and an inline frame element; means for, responsive to receiving the request, causing the platform to load a script element that creates the inline frame element and receives a secret token; means for authenticating an embedded session within the platform using the secret token; means for, responsive to authenticating the embedded session, generating an application programming interface (API) key, wherein the API key is used by the inline frame element to authenticate API requests to a resource associated with a third-party; means for receiving, via the inline frame element, data corresponding to the one or more embedded UI elements from the resource associated with a third-party, wherein the inline frame element is a proxy between the platform and the resource associated with a third-party; means for rendering the one or more embedded UI elements in a shadow document object model (DOM) based on the data corresponding to the one or more embedded UI elements received from the inline frame element, wherein the inline frame element does not render a UI; and means for causing display of the one or more embedded UI elements in the platform UI on the webpage.

In some embodiments, a computer program product is described. In some embodiments, the computer program product comprises one or more programs configured to be executed by one or more processors of a computer system. In some embodiments, the one or more programs includes instructions for: receiving a request to render components of a webpage, wherein the webpage includes a platform, a platform user interface (UI), one or more embedded UI elements, and an inline frame element; in response to receiving the request, causing the platform to load a script element that creates the inline frame element and receives a secret token; authenticating an embedded session within the platform using the secret token; in response to authenticating the embedded session, generating an application programming interface (API) key, wherein the API key is used by the inline frame element to authenticate API requests to a resource associated with a third-party; receiving, via the inline frame element, data corresponding to the one or more embedded UI elements from the resource associated with a third-party, wherein the inline frame element is a proxy between the platform and the resource associated with a third-party; rendering the one or more embedded UI elements in a shadow document object model (DOM) based on the data corresponding to the one or more embedded UI elements received from the inline frame element, wherein the inline frame element does not render a UI; and causing display of the one or more embedded UI elements in the platform UI on the webpage.

Executable instructions for performing these functions are, optionally, included in a non-transitory computer readable storage medium or other computer program product configured for execution by one or more processors. Moreover, details of one or more examples, implementations, and/or embodiments are set forth in the accompanying drawings and the description below. Other components, features, aspects, and potential advantages will be apparent from the description and drawings, and from the claims.

BRIEF DESCRIPTION OF THE FIGURES

For a better understanding of the various described embodiments, reference should be made to the Detailed Description below in conjunction with the following figures in which like reference numerals refer to corresponding parts throughout the figures.

FIG. 4 illustrates an exemplary webpage that includes embedded user interface elements in accordance with one or more embodiments described herein.

DETAILED DESCRIPTION

Businesses today rely on software tools to run aspects of their operations. These software tools can be accessed by an end user device via a webpage or web-connected application. For example, an end user device can interface with a software tool via a webpage managed (e.g., hosted, maintained) by a third-party service provider. The webpage can include one or more user interface elements/components that correspond to functions and services. For example, a dashboard webpage can include multiple user interface elements that each relate to a different function associated with managing a business. For instance, one such element can display a customer transactions list (e.g., purchases from the business), another element can display a summary of merchandise inventory, and another element can display a summary of accounting information (e.g., accounts receivable and payable). These functions and associated user interface elements can either be built by the webpage service provider's developers or be sourced from other third-party developers and embedded into the dashboard webpage. Embedding existing user interface elements and functionality from other third-party developers can reduce development time and resources needed by a third-party service provider.

Thus, there is a need for the ability to integrate functionality and associated UI element(s) from third-party developers into webpages. The functions and embedded UI elements are preferably integrated so that the embedded UI element is visually integrated into the platform webpage (e.g., such that the embedded UI element shares one or more characteristics of the webpage into which the embedded UI element is integrated). These embedded UI elements can be developed and published by their respective third-party developers for integration into a compatible webpage. Therefore, one or more aspects of the visual appearance of the embedded UI element are preferably isolated from being impacted by visual style templates (e.g., fonts, spacing, color, and/or other visual characteristics that can be defined via cascading style sheets) associated with the webpage. Further, to the extent that the embedded UI element relies on data that is subject to security or permissions-related restrictions for accessing needed data, the embedded UI element and associated programming preferably provides mechanisms that are compatible with such restrictions.

With the above framework in mind, attention is now turned to techniques for providing webpages (and/or applications) with embedded UI elements.

Figure 1:
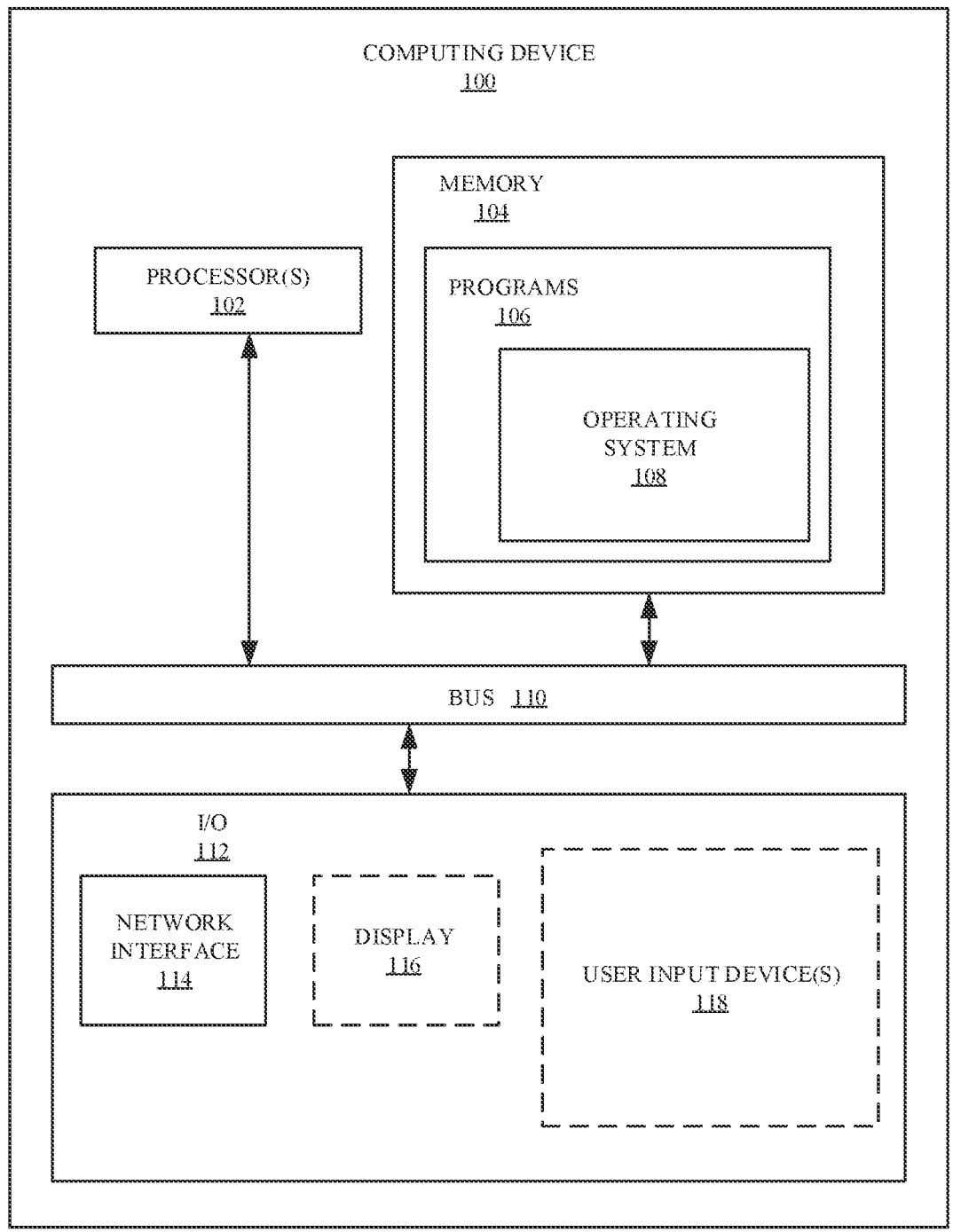
FIG. 1 illustrates a block diagram of a computing device that implements one or more processes in accordance with one or more embodiments described herein.

FIG. 1 illustrates an example computing device 100 (alternatively referred to as computing system 100, computer system 100, system 100, electronic device 100, and/or device 100) that can be used to support and/or implement the architecture and operations in accordance with one or more embodiments described herein. It will be apparent to those of ordinary skill in the art, however, that other alternative systems of various system architectures can also be used. For example, the other alternative systems can be a computing system with fewer, different, and/or additional components than those illustrated in (and/or described in relation to) FIG. 1 or a computing system including one or more devices 100 as illustrated in FIG. 1. In some embodiments, computing device 100 is a general-purpose computer. In some embodiments, computing device 100 is a special purpose (e.g., application specific) hardware device.

Computing device 100 illustrated in FIG. 1 includes one or more bus (or other internal communication component) 110 for communicating information and one or more processors 102 coupled to the bus 110 for processing information. Device 100 includes memory 104 coupled to bus 110. Memory 104 can include random access memory (RAM) or other volatile storage device for storing information and instructions to be executed by one or more processors 102 and/or for storing temporary variables or other intermediate information during execution of instructions by one or more processors 102. Memory 104 can also include non-volatile memory storage, such as read-only memory (ROM) and/or a static storage device for storing static information and instructions executable by processors 102, and one or more data storage devices such as a hard disk (e.g., magnetic disk), flash memory storage, or optical disk and its corresponding disk drive. This data storage device can be coupled to bus 110 for storing information and instructions. For example, memory 104 can store programs 106 in non-volatile memory. In some embodiments, the programs include one or more sets of computer-executable instructions for execution by the one or more processors 102. When ready for execution, the instructions are loaded into volatile memory and passed the processors for execution. The programs 106 can include an operating system 108 for managing the computing device's basic functionality, such as scheduling tasks, executing applications, and controlling peripheral devices. As used herein, the term "program" or "computer program" are considered synonymous with "application," "computer application, or "application component" unless otherwise stated in the context in which the term is used.

Computing device 100 can also include one or more input/output (I/O) components 112. FIG. 1 illustrates several example I/O components grouped together within I/O components 112 for illustration purposes only, and each such component therein does not necessarily need to be located together, or within a part of computing device 100. For example, an I/O component 112 can be an external device coupled to an interface of computing device 100. Computing device 100 can include network interface 114 for handling uplink and/or downlink communications with one or more other devices. The network interface 114 can itself be a communication device and can include any of a number of commercially available networking peripheral devices such as those used for coupling to an Ethernet connection, Wi-Fi connection, 3GPP mobile communication protocol (e.g., 3G, 4G, LTE, 5G, NR, and/or the like), and/or the like, to communicate over the Internet, a wide area network, a local area network, an ad-hoc (device-to-device network), or the like. Network interface 114 can be a modem connection, and/or any other mechanism that provides connectivity between the computing device 100 and one or more other devices. Note that one or more of the components of this system illustrated in FIG. 1 and associated hardware can be used in various embodiments as discussed herein.

Computing device 100 can optionally be coupled to display device 116, such as a light emitting diode (LED) display or a liquid crystal display (LCD) (e.g., coupled through bus 110 for displaying information to a user of computing device 100). Display device 116 can be integrated into computing device 100 (e.g., a touchscreen of a smartphone) or be external to computing device 100 (e.g., an external display coupled via a cable with device 100).

Computing device 100 can optionally include one or more user input device(s) 118, such as an alphanumeric input device (e.g., keyboard), a cursor control or other input signaling device (e.g., a touch-sensitive display (touchscreen), a touchpad, mouse, a trackball, stylus, or cursor direction keys) for controlling cursor movement and/or selection on a user interface displayed using display device 116.

In some embodiments, computing device 100 is a server or system of servers. For example, the server can be a collection of one or more computer hardware machines working together to perform processes and tasks described with respect to computing device 100. Thus, computing device 100 can be considered a logical construct, and references thereto can and should be interpreted as encompassing scope that includes computing device 100 being comprised of one or more computing devices (e.g., as device 100 is described) or several devices that together behave as computing device 100 has been described. As one of skill would appreciate, there is no requirement express or implied herein that the components of computing device 100 be dedicated or physical resources, or that the components must be located physically together. Rather, computing device 100 can be embodied in one or more virtual machines and/or certain functional components of computing device 100 can be remote from other functional components of device 100.

Figure 2:
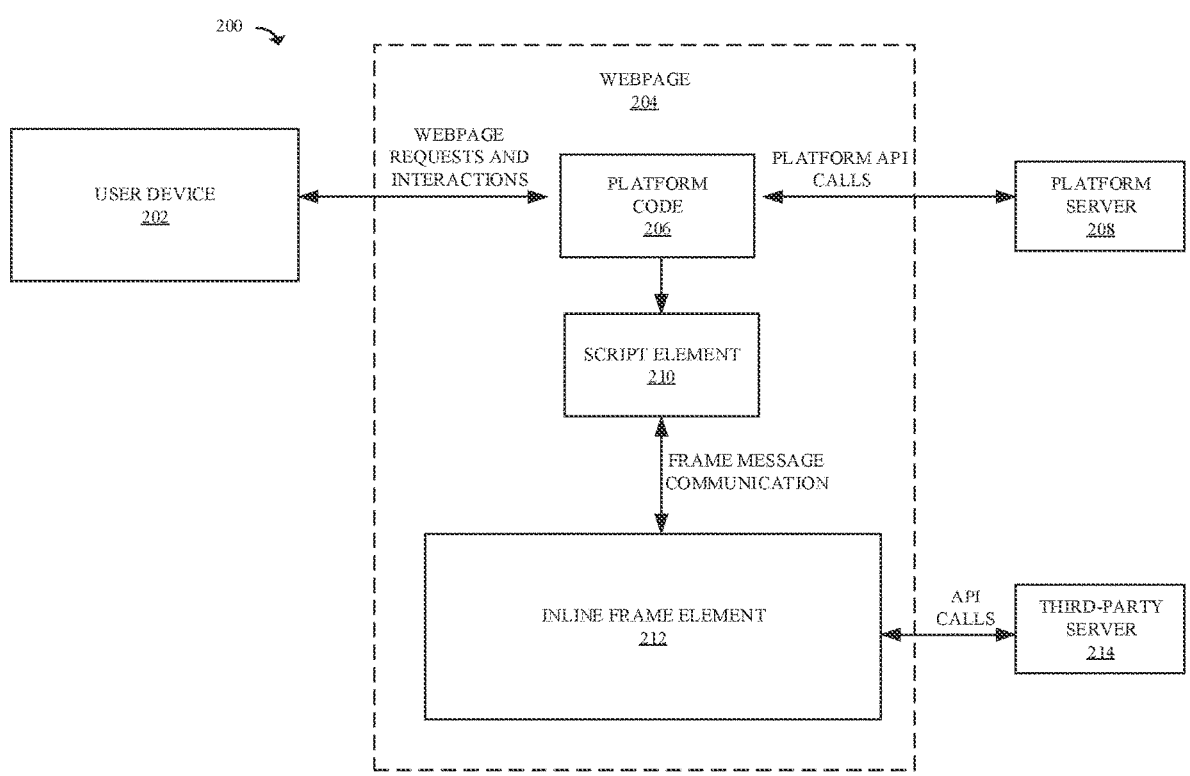
FIG. 2 illustrates an exemplary block diagram of a system for deploying embedded user interface elements in accordance with one or more embodiments described herein.

FIG. 2 illustrates an exemplary block diagram 200 of system for deploying embedded user interface elements in accordance with one or more embodiments described herein. FIG. 2 provides an exemplary scenario to explain one or more technical details of this disclosure. However, other examples could be contemplated to explain the one or more technical details of this disclosure, and the one or more technical details of this disclosure is not limited to the example discussed in relation to FIG. 2. User device 202, server 208, and third-party server 214 can include one or more features of computing device 100.

The example scenario shown in FIG. 2 corresponds to user device 202 (e.g., computing system 100) accessing a webpage that includes an embedded UI element provided by third-party server 214 (e.g., a server associated with a third party that is separate from server 208). In this example, user device 202 is associated with (e.g., logged into) a user account associated with webpage 204 (e.g., associated with and/or belonging to a manager of the webpage) and also associated with (e.g., logged into) a user account associated with a third-party server 214 (e.g., a third-party developer's service). The embedded UI element is created by a third-party developer that is different than a developer of server 208. While the example here refers to a webpage, it is equally applicable to an application (e.g., an application that is connected to the Internet).

With respect to FIG. 2, webpage 204 and server 208 are associated with a business services provider, and the webpage 204 is a webpage for subscribers of the business services provider to track business records and customer relationships. The service provider of webpage 204 integrates an embedded UI element that was created and developed by a third-party developer's platform. This embedded UI element is associated with one or more functions or services provided by the third-party developer platform. In this example, the third-party developer platform maintains business records (e.g., customer transactions) for the user account associated with user device 202.

In one example, the service provider integrates the embedded UI element from the third-party developer into webpage 204 to include a customer transaction tracking tool that accesses the subscriber's business transaction data, prints it to a screen, and allows interaction with the transaction data. Using the embedded UI element from the third-party developer reduces the amount of time that it takes to develop the frontend and/or backend components needed to provide users with the customer transaction tracking tool within webpage 204. Block diagram 200 illustrates at a high level the various components and interactions that occur when deploying an embedded UI element in accordance with one or more embodiments.

User device 202 requests webpage 204 via server 208 (which can include one or more servers). A webpage is a markup document to be displayed by a web browser (e.g., of user device 202). In some embodiments, the webpage is written in HTML. In response to receiving the request, one or more server 208 provides webpage 204 (including platform code 206) to user device 202. For example, providing webpage 204 can include providing a markup document (e.g., HTML document) to user device 202. Platform code 206 can include documents, code, links, styles, user interface elements, and/or other assets associated with a web platform used (e.g., offered) by the webpage 204. The platform code 206 can also include embedded UI elements (e.g., developed by third-party developers and hosted by a trusted third-party). In the example in FIG. 2, the webpage 204 includes its own UI elements (referred to as platform UI elements), as well as a third-party UI element (referred as an embedded UI element). In this embodiment, platform code 206 includes a script element 210 that is executed to create inline frame element 212 (sometimes referred to as an iframe). In some embodiments, the inline frame element is an invisible inline frame that includes no UI components that render to the webpage. This inline frame element 212 is used as a proxy for communication between the webpage platform (e.g., platform code 206) and third-party server 214. In some examples, third-party server 214 is managed by the trusted third-party developer. Communication between the third-party server 214 and platform code 206 can be performed via an API with third-party server 214. In some embodiments, the platform makes an API call via the inline frame element with an account identification of the connected end-user (e.g., of user device 202). In some embodiments, the script element creates a secret token (e.g., a signed authentication token, or the like). In some embodiments, the secret token is used to authenticate a session with the third-party server. In some embodiments, this authentication is used to authenticate future API calls and/or is used by third-party server 214 to enforce permissions. For example, a customer transaction user interface element embedded into the webpage may only have permission to view transactions (no permission to edit) and lack permission to view other data associated with the subscriber (e.g., no permission to view inventory). A secret token can uniquely identify an account or service associated with the session such that permissions associated with that account or service can be enforced.

As can be seen, FIG. 2 provides a basic framework of the architecture and communications for deploying an embedded UI element within a webpage or application. An embedded user interface element as described herein can be simple or complex. In some embodiments, an embedded UI element is an experience-type element (e.g., a large embedded element where several user interface interactions are enabled by the single large embedded element). In some embodiments, an embedded UI element is a feature-type element (e.g., an element corresponding to a discrete task or function (e.g., a transaction list, dispute processing)).

In some embodiments, experience-type UI elements are the primary focus of a page. For example, an experience-type UI element enables a subaccount (e.g., an end user account) to accomplish a set of tasks around a specific need. For example, an application management experience can allow a user to understand and perform actions to manage applications, by letting them find how much memory is being used by a particular application, download and/or update an application, see application details, etc. In some embodiments, an experience-type element includes transactional and informational functionality (both read/write as well as read-only functions). Experience-type elements can be useful in the following scenarios: when a webpage needs certain services to support another feature (e.g., a business needs a payment feature to support tipping), for webpage platforms with limited engineering resources, and for webpage that want to quickly deploy or test an idea or feature.

In some embodiments, feature-type UI elements are more discrete in nature than experience-type UI elements. For example, a discrete function is accomplished as an embedded UI element and can stand alone as a feature-type UI element or be included as one function of many in an experience-type UI element. For example, a transaction dispute function will live in a transactions list experience-type element but can also be a standalone feature-type UI element. Feature-type UI elements can be useful in the following scenarios: when a service provider that manages webpage wants to layer complex services on top of pre-built foundations, and when a service provider lacks the engineering resources to build time consuming and complex financial services functionality but wants more UI control than experience-type UI elements offer.

Figure 3:
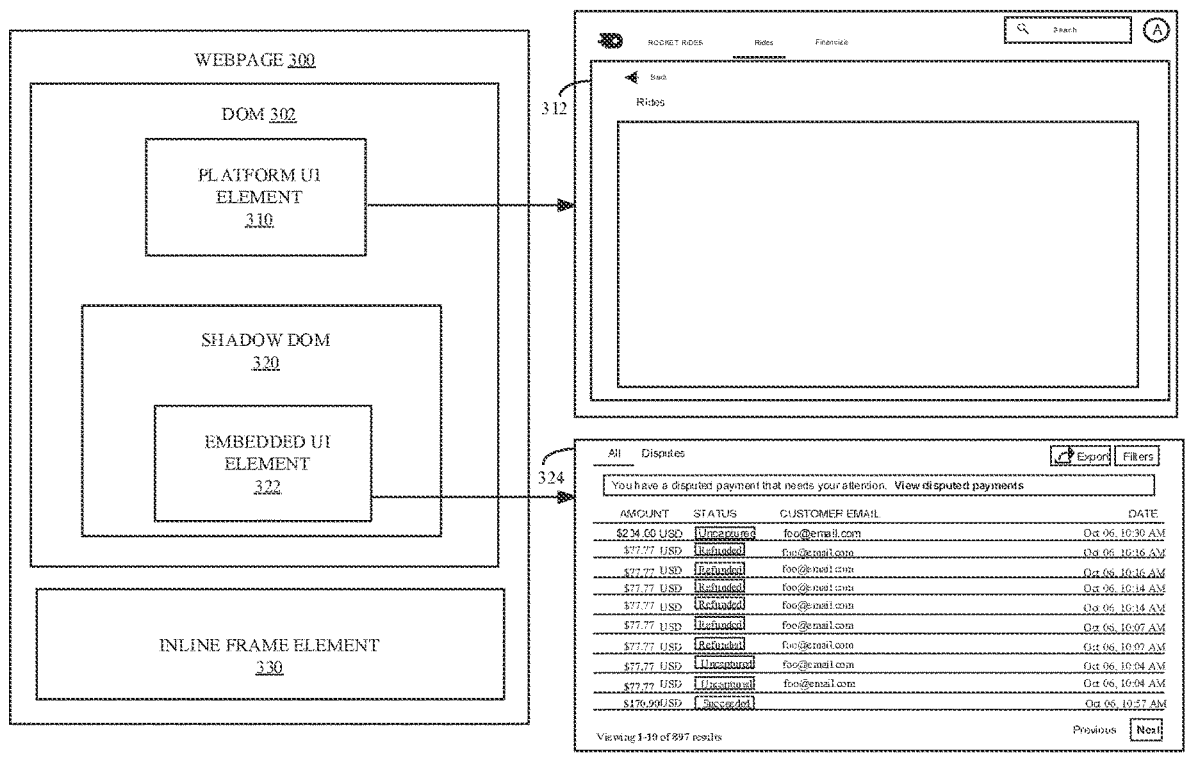
FIG. 3 illustrates an exemplary block diagram of webpage elements in accordance with one or more embodiments described herein.

FIG. 3 illustrates diagram 300 depicting blocks that represent exemplary elements of a webpage described herein in accordance with one or more embodiments described herein. FIG. 3 provides an exemplary scenario to explain one or more technical details of this disclosure; however, other examples could be contemplated to explain the one or more technical details of this disclosure, and the one or more technical details of this disclosure is not limited to the example discussed in relation to FIG. 3.

In some embodiments, a platform UI element is rendered using a document object model (DOM). In some embodiments, an embedded UI element is rendered using a shadow document object model (shadow DOM). A DOM (also referred to as a light DOM) is a representation of a webpage structure in the form of a tree, in which each element of a page is a node of the tree. The DOM is assembled by a web browser from a markup document (e.g., HTML document) of the webpage. A shadow DOM is an encapsulation technique that allows a developer to attach a "hidden" DOM tree (or trees) to an element of the DOM. The shadow DOM can include its own tree structure and styles. Encapsulation is achieved because the style of the element of the DOM does not affect the style of a custom component defined by the shadow DOM, and the shadow DOM does not affect styles of elements outside of the shadow DOM.

FIG. 3 illustrates a webpage that includes platform UI element 310, which is generated based on the webpage code that originates from the service provider's resource (e.g., server). DOM 302 is used to render platform UI element 310. Rendered platform UI element 312 depicts platform UI element 310 as it appears after being rendered (using DOM 302) and displayed (e.g., such as at user device 202). As shown, rendered platform UI element 312 includes branding associated with the webpage manager ("Rocket Rides") and some selectable options associated with the webpage (tabs for "Rides" and "Financials", and a search bar). As shown in FIG. 3, platform UI element 312 includes a blank area with no content, where an embedded UI element (e.g., 324) appears once the webpage is fully rendered.

FIG. 3 also illustrates shadow DOM 320. Shadow DOM 320 is used to render embedded UI element 322 as part of the embedded component <third-party-payments-experience>. Rendered embedded UI element 324 represents embedded UI element 322 after rendering by shadow DOM 320 and displayed. Rendered embedded UI element 324 shows a payment transaction list. The payment transaction list includes data accessed via inline frame element 330 acting as a proxy between the webpage and a third-party server that controls access to and provides such data. FIG. 3 also shows inline frame element 330, which has no rendered UI components. In some embodiments, inline frame element 330 has no rendered UI components defined within inline frame element 330 (e.g., within the mockup (e.g., HTML mockup) that is originally delivered to the system hosting the webpage). In some embodiments, inline frame element 330 has one or more UI components that are rendered. For example, the inline frame element 330 can cause a small number or amount of UI to be rendered.

The use of a shadow DOM as described above can help achieve the modularity and portability of the embedded UI elements, allowing them to be placed in many different types of service providers' webpages without being adversely affected in appearance by platform-specific or implementation-specific settings. In some embodiments, there is one shadow DOM per embedded UI element. In some embodiments, a purpose of the shadow DOM is to provide style isolation between the UI rendered by embedded UI elements and platform UI elements. In some embodiments, the shadow DOM can ensure that the styles of the service provider webpage (e.g., as defined by a DOM (e.g., non-shadow DOM) of the webpage) do not affect embedded UI element styles (e.g., established by the third-party developer platform). In some embodiments, the shadow DOM ensures also that embedded UI elements styles don't affect the service provider's UI styles. Rather the style and appearance of the embedded UI elements can be a function of data received from a server that serves the webpage via the inline frame element.

By using a shadow DOM to render embedded UI elements and not rendering the associated UI in the inline frame element (e.g., iframe), one or more benefits can result. In some embodiments, embedded UI elements can be configured to optionally directly use/inherit custom fonts defined by the webpage. Because the embedded UI element is included in the markup document, such custom fonts can be directly inherited. This stands in contrast to needing to inject via a font URL to an iframe for a UI element rendered from the iframe. Thus, encapsulation can be achieved, while maintaining the option to coordinate style(s) with the platform UI. In some embodiments, there is no need for iframe size listeners to resize embedded UI elements. Standing in contrast to rendering all embedded UI through an iframe, the embedded UI elements rendered with a shadow DOM can resize (e.g., due to user interaction) just like any other platform UI element would according to styling rules set by the webpage. In some embodiments, the latency for loading initial UI can be faster. For example, as compared to rendering UI through an iframe, there is no need to load a separate HTML page for the embedded UI elements to render, thus possibly reducing latency.

Notably, iframes can be difficult to deploy in a way that maintains an acceptable user experience across implementations and/or user interactions. The techniques described herein can achieve the benefits of using iframes as a data transfer layer without certain downsides of using iframes for rendering UI. Thus, style isolation benefits can be achieved while avoiding such downsides.

Figure 4:
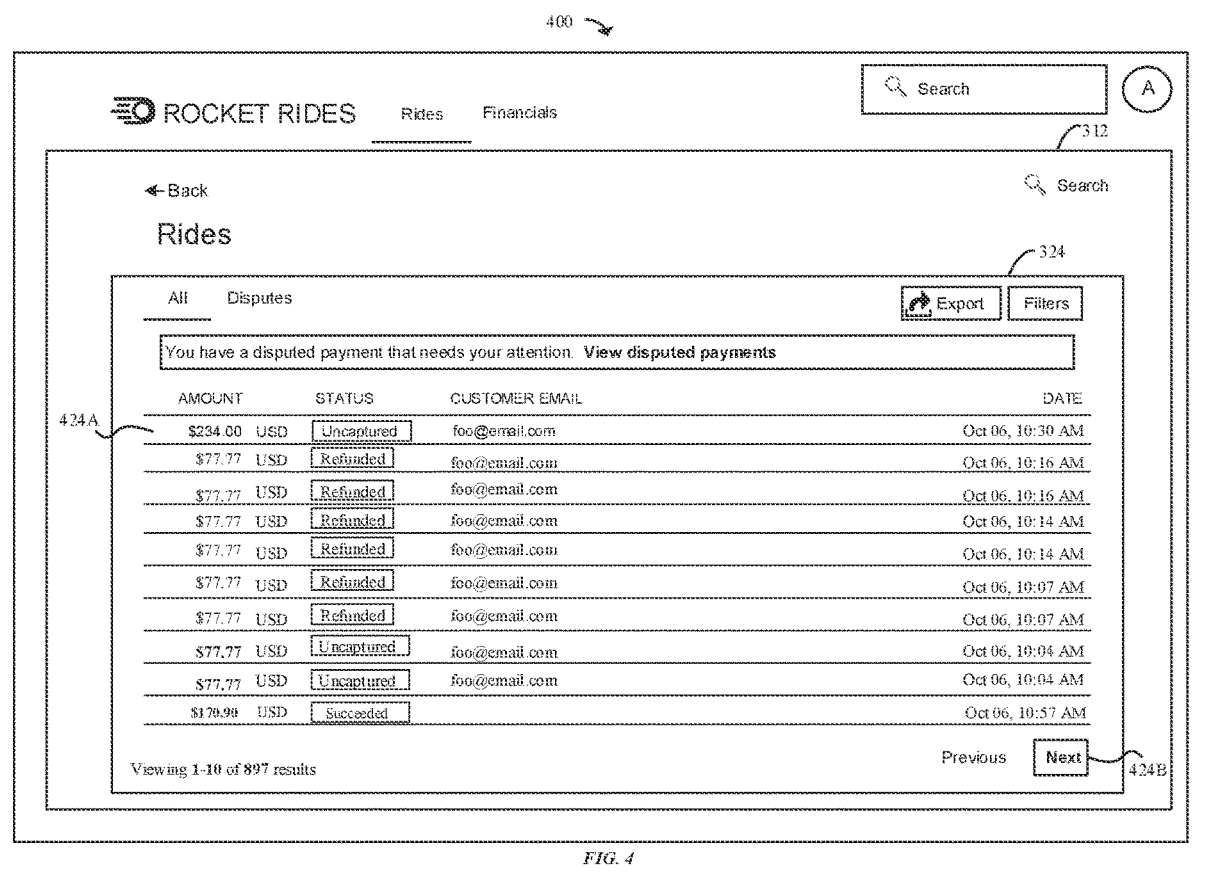

FIG. 4 illustrates an example webpage 400 that includes embedded user interface elements in accordance with one or more embodiments described herein. FIG. 4 provides an exemplary scenario to explain one or more technical details of this disclosure; however, other examples could be contemplated to explain the one or more technical details of this disclosure, and the one or more technical details of this disclosure is not limited to the example discussed in relation to FIG. 4.

FIG. 4 illustrates the user interface elements from FIG. 3 rendered together as a webpage 400, as would be displayed by device of a user accessing the webpage (e.g., such as computing device 100). Rendered embedded UI element 324 is shown occupying the blank space in rendered platform UI element 312. Embedded UI element 324 itself can include one or more embedded UI elements (e.g., sub-elements). In FIG. 4, rendered embedded UI element 324 includes payments list items 324A, which can be interacted with by a user (e.g., to manipulate or edit the data or data presentation). In FIG. 4, rendered embedded UI element 324 also includes navigation buttons 324B, which can be interacted with by a user (e.g., to navigate through the payments list). As can be seen in FIG. 4, the deployment of embedded UI element 324 within webpage 400 appears seamless.

Figure 5:
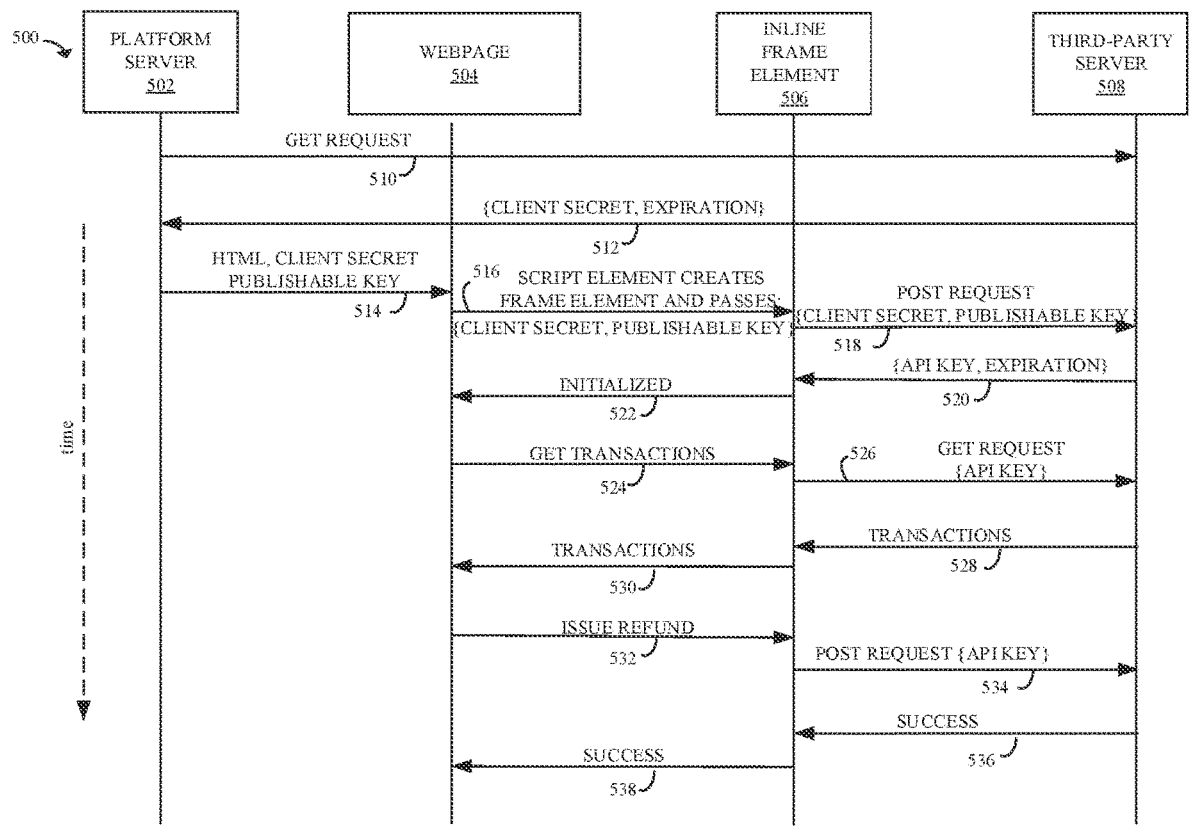
FIG. 5 illustrates a flow diagram for deploying embedded user interface elements in accordance with one or more embodiments described herein.

FIG. 5 illustrates an exemplary communications flow diagram 500 for deploying embedded user interface elements in accordance with one or more embodiments described herein. FIG. 5 provides an exemplary scenario to explain one or more technical details of this disclosure; however, other examples could be contemplated to explain the one or more technical details of this disclosure, and the one or more technical details of this disclosure is not limited to the example discussed in relation to FIG. 5.

Communications flow diagram 500 depicts server 502, webpage 504, inline frame element 506, and third-party server 508. Communications flow diagram 500 illustrates a set of communications between these listed components that ultimately result in a rendered version of a webpage that includes embedded UI elements in accordance with some embodiments. An example of a rendered version of the webpage is illustrated as webpage 400 in FIG. 4. Server 502 can include one or more features as described above with respect to any of device 100 and server 208. Webpage 504 can include one or more features as described above with respect to any of webpage 204, platform code 206, and script 210. While shown as a separate logical entity for communication purposes in FIG. 5, webpage 504 can exist on the device rendering webpage 504 (e.g., device 100 or user device 202). In some embodiments, webpage 504 includes script element 210. Inline frame element 506 can include one or more features as described above with respect to any of inline frame element 212 and element 330. While shown as a separate logical entity for communication purposes in FIG. 5, inline frame element 506 can exist on the device rendering webpage 504 (e.g., device 100 or user device 202). Server 508 can include one or more features as described above with respect to any of device 100 and third-party server 214. In some embodiments, the device rendering a webpage is different from the device displaying the webpage (e.g., the displaying device is a thin client).

At step 510, server 502 issues a GET request to server 508. Server 508 represents an interface (e.g., API) used to communicate with one or more systems of the third-party developer platform that develops and supports the embedded UI element architecture and ecosystem as described herein. At step 512, server 508 responds to server 502 with a client secret (e.g., a password, one or more characters, a hash, a token, and/or one or more encrypted values) and an associated expiration for the client secret. For example, this client secret can be used to authenticate a session with the inline frame element 506 that will proxy communication between webpage 504 and the server 508.

An example POST command issued by a trusted third-party entity via server 508 and received by an element of the webpage is included below, which includes a client secret.

```
POST /v1/delegation_intents \
 -u sk_live_platformapikeyhere: \
 -d account-acct_someaccountid
```

⇒
{
  "client_secret": "some random string", "expires_at": 1234 # 60 seconds in the future
}

The service provider (e.g., server 502) takes the client secret returned in the result and passes it to its frontend (e.g., webpage 504) along with a publishable key. Both are embedded into the rendered HTML:

```
<html>
  <head>
    <script src="https://connect-script.third_party_platform.com/v1/connect.js"></script>
  </head>
  <body>
    <!-- normal content here -->
    < third_party_platform -container publishable-key="pk_live_apubkey" client-secret="some random string">
      <h1>Normal html the platform adds in</h1>
      <third_party_platform-transactions></third_party_platform -transactions>
    </ third_party_platform -container>
  </body>
</html>
```

At step 514, server 502 passes HTML components, the client secret, and the publishable key to webpage 504. For example, the HTML components can include references to platform UI elements (e.g., elements that are not embedded via the trusted third-party developer's ecosystem) as well as to a script element. In some embodiments, the script element causes the performance of processes established by the third-party developer of the embedded UI element and is necessary for rendering the embedded UI element. For example, the processes can include processes for loading embedded UI elements, for setting up a data layer between the embedded UI elements and an inline frame element, for creating appropriate permission/security context for the embedded UI elements, and/or for creating the inline frame element 506. At this point (step 514), the webpage 504 can be considered a blank page or at least an incomplete page because it does not have information for rendering embedded UI elements (e.g., called by a script element). At step 516, webpage 504 executes a script element, which creates inline frame element 506, and passes the client secret and the publishable key to the inline frame element 506.

In some embodiments, a script element includes one or more functional layers. As an example, there can be three functional layers that make up what is referred to as a "script element" as described herein. Each of these layers are built together and deployed by the service provider. In some embodiments, webpage script file is a script (e.g., JavaScript) file which is added to the webpage. In some embodiments, the script file executes in the webpage, and loads all embedded UI elements, handles setting up the data layer (e.g., between the webpage and the inline frame element), and creates appropriate permission and security context for the embedded UI elements. In some embodiments, this script file also inserts an inline frame element (e.g., an invisible <iframe>) into the webpage, which points to an html page (e.g., "script_element.html" described below). In some embodiments, this script file contains the platform context data layer, which packages up requests from embedded UI elements and sends them to the inline frame element, as well as handling responses and webpage observability. In some embodiments, script element HTML file (e.g., "script_element.html") is an HTML file. In some embodiments, it is served from the third-party developer platform (e.g., an associated third-party server 214, such as a server or CDN). In some embodiments, the role of this script element HTML file is to execute script content (e.g., described below) included in the script element HTML file, that makes up the trusted side of the data layer (e.g., between the webpage and the inline frame element). In some embodiments, script content in the script element HTML file is inside of the script element HTML file, script content (e.g., JavaScript) is executed, which handles setting up authentication, providing authentication to requests, and doing all communication through the inline frame element (e.g., iframe) to the third-party developer platform (e.g., using the third-party developer's API). In some embodiments, the script element includes an Authentication API. For example, this can be a public API method, "/v1/delegation_intent," which the webpage calls from server 502. This API method creates a request to start an embedded session for a given connected account (e.g., of the end user of the webpage 504). The server 502 receives a secret token that they pass off to the script element. In some embodiments, the script element passes this secret to the inline frame element 506 (e.g., iframe), which calls a private API method, /v1/delegation_intents/claim to consume that secret, and return an API key (e.g., also referred to as a merchant key or user key) which the inline frame element 506 then uses to authenticate requests made to the server 508.

In some embodiments, the script element of webpage 504 and/or inline frame element 506 form an API proxy. In some embodiments, when an embedded UI element (e.g., a transactions list element) needs to fetch data from the third-party developer platform, an API client is provided by the script element which transparently proxies the API request through the inline frame element 506 to the script inside of the inline frame element 506 (e.g., script content in the script element HTML file). The script inside of the inline frame element adds the authentication it has set up, and then calls the third-party provider's API endpoint (e.g., api.third-party.com), which returns the result back through the inline frame element 506.

In some embodiments, permissions for accessing and/or modifying data is controlled by one or more of account policy and limitations imposed on or by a platform. For example, a user account (subaccount) logged in through a web browser that loads the service provider webpage can have a limited set of permissions. This set of permissions can be the intersection of what the webpage 504 (e.g., using the respective embedded UI element) is permitted to do and/or what the third-party developer platform permits the subaccount to do (e.g., using the respective embedded UI element). For example, the third-party developer platform can limit permissions for requests received via embedded UI elements so that the elements are only subject to a single authentication factor. In some embodiments, there is an upper bound for the number of embedded requests from a webpage platform. For example, permissions can thus be decided by the intersection:

<account permissions> & <service provider permissions> & embedded_upper_bound

In some embodiments, a single authentication factor is required for access by a subaccount. This allows some level of activity by the user via the embedded UI element. However, exposure of some functionality that might involve high risk for fraud or sensitive information (e.g., changing an external account, personal details, etc.), can require additional authentication factors. In some embodiments, a multi-factor authentication is required for access by a subaccount. Once additional required authentication factor is provided, the subaccount user can be granted additional permissions.

Turning back to FIG. 5, at step 518, the inline frame element 506 issues a POST request to server 508, the POST request including the client secret and the publishable key. At this stage, the inline frame element 506 is attempting to establish authentication with server 508, such that the inline frame element 506 can act as a trusted proxy between the webpage 504 and the server 508. At step 520, the server 508 issues a response that includes an API key (e.g., for signing communication between the inline frame element 506 using the server 508) and an associated expiration for the API key. At step 522, the inline frame element 506 is initialized (e.g., and informs one or more components of webpage 504). At this point, the inline frame element 506 can now request and receive data related to embedded UI elements via the server 508.

At step 524, the webpage 504 issues a request to the inline frame element 506 for transactions data associated with an embedded UI element (e.g., element 424 in FIG. 4). At step 526, the inline frame element 506 (acting as a proxy) issues a GET request (including the API key) through the server 508. At step 528, the server 508 responds with transactions data to the inline frame element 506 as proxy, which is then passed to the webpage 504 at step 530. At this point, the webpage 504 can be considered loaded because the webpage 504 has received the appropriate data for rendering the embedded UI element for presenting transactions data.

Steps 532-538 illustrate an example series of communications for user interaction with the embedded UI element for presenting transactions data. At step 532, the webpage 504 issues a request to perform a refund of a particular transaction to the inline frame element 506. For example, the user of webpage 400 right clicked a transaction in list 424A and selected an option to "Refund Transaction." At step 534, the inline frame element 506 (acting as a proxy) issues a POST request (including the API key) through the server 508. At step 536, the server 508 responds with an indication that the refund has been successfully processed to the inline frame element 506 as proxy, which is then passed to the webpage 504 at step 538. This indication can include data that causes and/or allows the embedded UI element displayed within the webpage 504 to appear updated (e.g., a displayed transaction can be marked with a visible indicator "Refunded").

Figure 6:
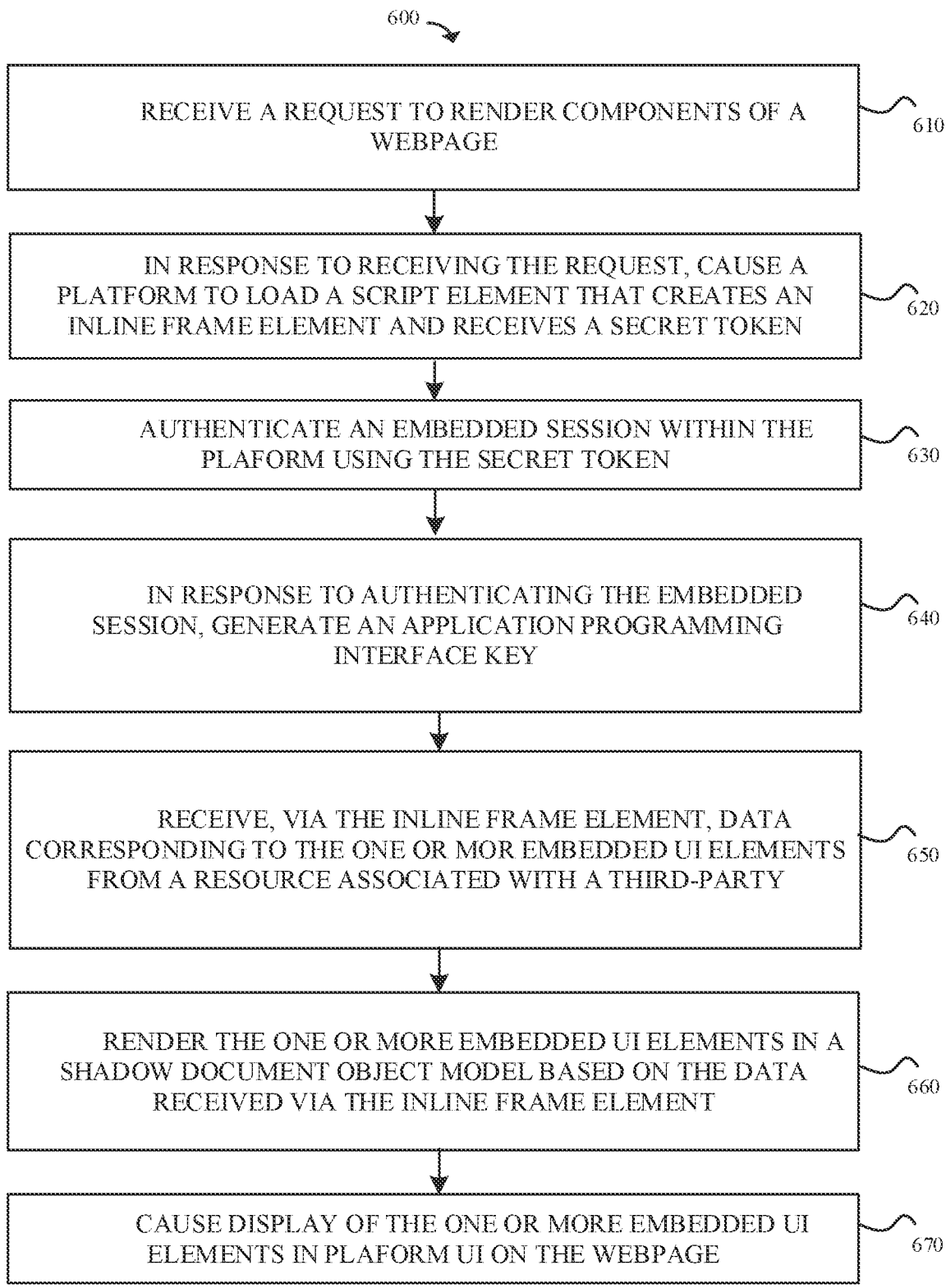
FIG. 6 illustrates a flow diagram illustrating a method for deploying embedded user interface elements in accordance with one or more embodiments described herein.

FIG. 6 is a flow diagram illustrating a method (e.g., method 600) for providing an application in accordance with one or more embodiments described herein. In some embodiments, method 600 is performed at a computer system (e.g., one or more servers, a smart phone, a desktop computer, and/or a tablet). In some embodiments, the computer system that performs the method 600 includes one or more components as described above, such as computing system 100.

At block 610, the computer system (e.g., 100, 208) receives a request to render components of a webpage (e.g., 400), wherein the webpage includes a platform (e.g., comprising platform code 206), a platform user interface (UI) (e.g., one or more platform UI element) (e.g., a user interface that includes one or more user interface elements (e.g., buttons, content, selectable objects, colors, and/or the like)), one or more embedded UI elements (e.g., 324), and an inline frame element (e.g., 506).

At block 620, in response to receiving the request, the computer system causes the platform to load a script element (e.g., 210) that creates the inline frame element and receives a secret token.

At block 630, the computer system authenticates an embedded session within the platform using the secret token.

At block 640, in response to authenticating the embedded session, the computer system generates an application programming interface (API) key, wherein the API key is used by the inline frame element to authenticate API requests to a resource associated with a third-party (e.g., 100, 214, 508). In some embodiments, the secret token is used to generate (e.g., receive, create, or otherwise obtain) the API key. In some embodiments, the secret token and/or the API key is encrypted.

At block 650, the computer system receives, via the inline frame element, data corresponding to the one or more embedded UI elements from the resource associated with a third-party (e.g., 214), wherein the inline frame element is a proxy between the platform and the resource associated with a third-party.

At block 660, the computer system renders the one or more embedded UI elements in a shadow document object model (DOM) based on the data corresponding to the one or more embedded UI elements received from the inline frame element, wherein the inline frame element does not render a UI. In some embodiments, the inline frame element does not cause any user interface elements to be rendered and displayed in the webpage. In some embodiments, use of the shadow DOM to render the embedded UI elements means that styles programmed by the service provider that manages webpage 504 will not affect the appearance of the embedded UI elements rendered using the shadow DOM. In some embodiments, this can allow easier integration by a provider, because they do not need to worry about integrating and/or customizing formatting (and dealing with the errors that can result when accessed by differing hardware devices or under differing conditions).

At block 670, the computer system causes display (e.g., on a display of the computer system, or at a display of another device or system) of the one or more embedded UI elements in the platform UI on the webpage. For example, FIG. 4 illustrates an example webpage with a rendered and displayed embedded UI element 424 displayed in platform UI 412.

In some embodiments, the shadow DOM isolates (e.g., prohibits and/or protects) one or more style characteristics of the one or more embedded UI elements from being set by another DOM for the platform UI. For example, the DOM used to render platform UI elements is the other DOM.

In some embodiments, the one or more embedded UI elements are part of a plurality of embedded UI elements referenced in the script element. In some embodiments, each of the plurality of embedded UI elements are rendered using a respective shadow document object model (DOM) of a plurality of shadow DOMs (e.g., that are each defined in a mock-up language (e.g., HTML)). In some embodiments, the plurality of shadow DOMs isolates one or more style characteristics of their respective embedded UI elements from being set by one or more other DOMs that are used to style the platform UI. For example, different embedded UI elements (such as 424A and 424B) can each be associated with a separate shadow DOM.

In some embodiments, the computer system receives event data representing user interaction (e.g., edit or modification, addition, or deletion of data represented by the embedded UI element) with at least a portion of the one or more embedded UI elements. In some embodiments, in response to receiving the event data, the computer system issues an element interaction request to a third-party entity (e.g., third-party developer associated with server 508), via the inline frame element that is a proxy between the platform and the server, based on the event data. For example, the computer system receives input to refund a particular transaction represented by an embedded UI element that is displayed. In some embodiments, this request (e.g., to refund a particular transaction represented by an embedded UI) is relayed back to the third-party developer platform via the inline frame element as proxy.

In some embodiments, the computer system receives a response, from a resource (e.g., 214, 508) associated with the third-party entity via the inline frame element, to the element interaction request, wherein the response includes updated data corresponding to the portion of the one or more embedded UI elements. In some embodiments, the computer system causes an updated display of the webpage to include an updated representation of the portion of the one or more embedded UI elements that is generated based on the updated data corresponding to the portion of the one or more embedded UI elements. For example, the displayed webpage can include an updated embedded UI element that visually indicates that the selected transaction has been successfully refunded.

In some embodiments, the inline frame element is a headless iframe. A headless iframe is also referred to as an invisible iframe. In some embodiments, a headless iframe does not include user interface content that is rendered in a webpage.

It is to be understood that the above description is intended to be illustrative, and not restrictive. Many other embodiments will be apparent to those of skill in the art upon reading and understanding the above description. The scope should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the described embodiments to the precise forms disclosed. Many modifications and variations are possible in view of the above teachings. The embodiments were chosen and described to best explain the principles and practical applications of the various embodiments, to thereby enable others skilled in the art to best utilize the various embodiments with various modifications as may be suited to the particular use contemplated.

What is claimed is:

1. A computer system, comprising:
one or more processors; and
a memory storing one or more programs configured to be executed by the one or more processors, the one or more programs including instructions to perform:
receiving a request to render components of a webpage, wherein the webpage includes a platform, a platform user interface (UI), one or more embedded UI elements, and an inline frame element;
in response to receiving the request, causing the platform to load a script element that creates the inline frame element and receives a secret token;

authenticating an embedded session within the platform using the secret token;

in response to authenticating the embedded session, generating an application programming interface (API) key, wherein the API key is used by the inline frame element to authenticate API requests to a resource associated with a third-party;

receiving, via the inline frame element, data corresponding to the one or more embedded UI elements from the resource associated with the third-party, wherein the inline frame element is a proxy between the platform and the resource associated with the third-party;

rendering the one or more embedded UI elements in a shadow document object model (DOM) based on the data corresponding to the one or more embedded UI elements received from the inline frame element, wherein the inline frame element does not render a UI; and causing display of the one or more embedded UI elements in the platform UI on the webpage.

2. The computer system of claim 1, wherein the shadow DOM isolates one or more style characteristics of the one or more embedded UI elements from being set by another DOM for the platform UI.

3. The computer system of claim 1, wherein:

the one or more embedded UI elements are part of a plurality of embedded UI elements referenced in the script element;

each embedded UI element of the plurality of embedded UI elements is rendered using a respective shadow DOM of a plurality of shadow DOMs; and the plurality of shadow DOMs isolate one or more style characteristics of their respective embedded UI elements from being set by one or more other DOMs that are used to style the platform UI.

4. The computer system of claim 1, the one or more programs further including instructions to perform:

receiving event data representing user interaction with at least a portion of the one or more embedded UI elements; and in response to receiving the event data, issuing an element interaction request to the third-party, via the inline frame element that is a proxy between the platform and the resource associated with the third-party, based on the event data.

5. The computer system of claim 4, the one or more programs further including instructions to perform:

receiving a response, from the resource associated with the third-party via the inline frame element, to the element interaction request, wherein the response includes updated data corresponding to the portion of the one or more embedded UI elements; and causing an updated display of the webpage to include an updated representation of the portion of the one or more embedded UI elements that is generated based on the updated data corresponding to the portion of the one or more embedded UI elements.

6. The computer system of claim 1, wherein the inline frame element is a headless inline frame.

7. A non-transitory computer-readable storage medium storing one or more programs configured to be executed by one or more processors of a computer system, the one or more programs including instructions to perform:

receiving a request to render components of a webpage, wherein the webpage includes a platform, a platform user interface (UI), one or more embedded UI elements, and an inline frame element;

in response to receiving the request, causing the platform to load a script element that creates the inline frame element and receives a secret token;

authenticating an embedded session within the platform using the secret token;

in response to authenticating the embedded session, generating an application programming interface (API) key, wherein the API key is used by the inline frame element to authenticate API requests to a resource associated with a third-party;

receiving, via the inline frame element, data corresponding to the one or more embedded UI elements from the resource associated with the third-party, wherein the inline frame element is a proxy between the platform and the resource associated with the third-party;

rendering the one or more embedded UI elements in a shadow document object model (DOM) based on the data corresponding to the one or more embedded UI elements received from the inline frame element, wherein the inline frame element does not render a UI; and causing display of the one or more embedded UI elements in the platform UI on the webpage.

8. The non-transitory computer-readable storage medium of claim 7, wherein the shadow DOM isolates one or more style characteristics of the one or more embedded UI elements from being set by another DOM for the platform UI.

9. The non-transitory computer-readable storage medium of claim 7, wherein:

the one or more embedded UI elements are part of a plurality of embedded UI elements referenced in the script element;

each embedded UI element of the plurality of embedded UI elements is rendered using a respective shadow DOM of a plurality of shadow DOMs; and the plurality of shadow DOMs isolate one or more style characteristics of their respective embedded UI elements from being set by one or more other DOMs that are used to style the platform UI.

10. The non-transitory computer-readable storage medium of claim 7, the one or more programs further including instructions to perform:

receiving event data representing user interaction with at least a portion of the one or more embedded UI elements; and in response to receiving the event data, issuing an element interaction request to the third-party, via the inline frame element that is a proxy between the platform and the resource associated with the third-party, based on the event data.

11. The non-transitory computer-readable storage medium of claim 10, the one or more programs further including instructions to perform:

receiving a response, from the resource associated with the third-party via the inline frame element, to the element interaction request, wherein the response includes updated data corresponding to the portion of the one or more embedded UI elements; and causing an updated display of the webpage to include an updated representation of the portion of the one or more embedded UI elements that is generated based on the updated data corresponding to the portion of the one or more embedded UI elements.

12. The non-transitory computer-readable storage medium of claim 7, wherein the inline frame element is a headless inline frame.

13. The non-transitory computer-readable storage medium of claim 7, the one or more programs further including instructions to perform:
receiving one or more of the components of the webpage from a platform server associated with an entity that is different from the third-party.

14. A method, comprising:
receiving a request to render components of a webpage, wherein the webpage includes a platform, a platform user interface (UI), one or more embedded UI elements, and an inline frame element;
in response to receiving the request, causing the platform to load a script element that creates the inline frame element and receives a secret token;
authenticating an embedded session within the platform using the secret token;
in response to authenticating the embedded session, generating an application programming interface (API) key, wherein the API key is used by the inline frame element to authenticate API requests to a resource associated with a third-party;
receiving, via the inline frame element, data corresponding to the one or more embedded UI elements from the resource associated with the third-party, wherein the inline frame element is a proxy between the platform and the resource associated with the third-party;
rendering the one or more embedded UI elements in a shadow document object model (DOM) based on the data corresponding to the one or more embedded UI elements received from the inline frame element, wherein the inline frame element does not render a UI; and
causing display of the one or more embedded UI elements in the platform UI on the webpage.

15. The method of claim 14, wherein the shadow DOM isolates one or more style characteristics of the one or more embedded UI elements from being set by another DOM for the platform UI.

16. The method of claim 14, wherein:
the one or more embedded UI elements are part of a plurality of embedded UI elements referenced in the script element;
each embedded UI element of the plurality of embedded UI elements is rendered using a respective shadow DOM of a plurality of shadow DOMs; and
the plurality of shadow DOMs isolate one or more style characteristics of their respective embedded UI elements from being set by one or more other DOMs that are used to style the platform UI.

17. The method of claim 14, further comprising:
receiving event data representing user interaction with at least a portion of the one or more embedded UI elements; and
in response to receiving the event data, issuing an element interaction request to the third-party, via the inline frame element that is a proxy between the platform and the resource associated with the third-party, based on the event data.

18. The method of claim 17, further comprising:
receiving a response, from the resource associated with the third-party via the inline frame element, to the element interaction request, wherein the response includes updated data corresponding to the portion of the one or more embedded UI elements; and
causing an updated display of the webpage to include an updated representation of the portion of the one or more embedded UI elements that is generated based on the updated data corresponding to the portion of the one or more embedded UI elements.

19. The method of claim 14, wherein the inline frame element is a headless inline frame.

20. The method of claim 14, further comprising:
receiving one or more of the components of the webpage from a platform server associated with an entity that is different from the third-party.

* * * * *